(12) United States Patent
McMurrer

(10) Patent No.: US 7,642,906 B1
(45) Date of Patent: Jan. 5, 2010

(54) VEHICLE OPERATOR SAFETY SIGNAL

(76) Inventor: Matthew McMurrer, 5478 SE. 35th Loop, Ocala, FL (US) 34480

( * ) Notice: Subject to any disclaimer, the term of this patent is extended or adjusted under 35 U.S.C. 154(b) by 297 days.

(21) Appl. No.: 11/900,188

(22) Filed: Sep. 11, 2007

(51) Int. Cl.
*B60Q 1/00* (2006.01)

(52) U.S. Cl. .................. 340/457; 340/471; 340/473; 40/591; 116/29; 116/51

(58) Field of Classification Search .......... 340/457, 340/488, 907, 908, 433, 471, 473, 425.5; 40/541, 584, 588, 591; 116/50–52
See application file for complete search history.

(56) References Cited

U.S. PATENT DOCUMENTS

| | | | |
|---|---|---|---|
| 1,411,780 A | | 4/1922 | Gore |
| 3,678,456 A | | 7/1972 | Gruber |
| 3,788,268 A | | 1/1974 | Hiatt et al |
| 4,833,448 A | | 5/1989 | Chang |
| 4,916,372 A | | 4/1990 | Reavell et al. |
| 5,103,205 A | * | 4/1992 | Halligan ............... 340/473 |
| 5,166,663 A | | 11/1992 | Leis |
| 5,281,948 A | * | 1/1994 | Estrada .................. 340/433 |
| 5,355,117 A | * | 10/1994 | Jefferson .............. 340/425.5 |
| 5,450,058 A | * | 9/1995 | Collier .................. 340/473 |
| 5,696,484 A | * | 12/1997 | Kim ...................... 340/471 |
| 6,037,866 A | | 3/2000 | Leibowitz |
| 6,396,395 B1 | * | 5/2002 | Zielinski et al. ......... 340/425.5 |
| 6,809,654 B2 | * | 10/2004 | Hudson ................. 340/907 |
| 7,028,883 B1 | * | 4/2006 | Choi ..................... 232/35 |
| 7,068,160 B2 | | 6/2006 | Tourneur et al. |
| 2007/0146125 A1 | * | 6/2007 | Kim ..................... 340/475 |

* cited by examiner

*Primary Examiner*—Davetta W Goins
*Assistant Examiner*—Hoi C Lau
(74) *Attorney, Agent, or Firm*—Sven W. Hanson

(57) ABSTRACT

A device and system is provided for alerting or signaling a vehicle driver after the driver leaves a vehicle compartment. A signaling device, in a deployed condition, is physically located in a forward line-of-sight of a driver operator of the vehicle. The signaling device is deployed automatically in the event of the opening of a vehicle door from the inside of a vehicle compartment. Resetting of the signaling device, out of the line-of-sight, requires manual operation by the vehicle operator outside the vehicle compartment. The system ensures that the operator will be alerted to safety procedures required after activities outside vehicle.

5 Claims, 3 Drawing Sheets

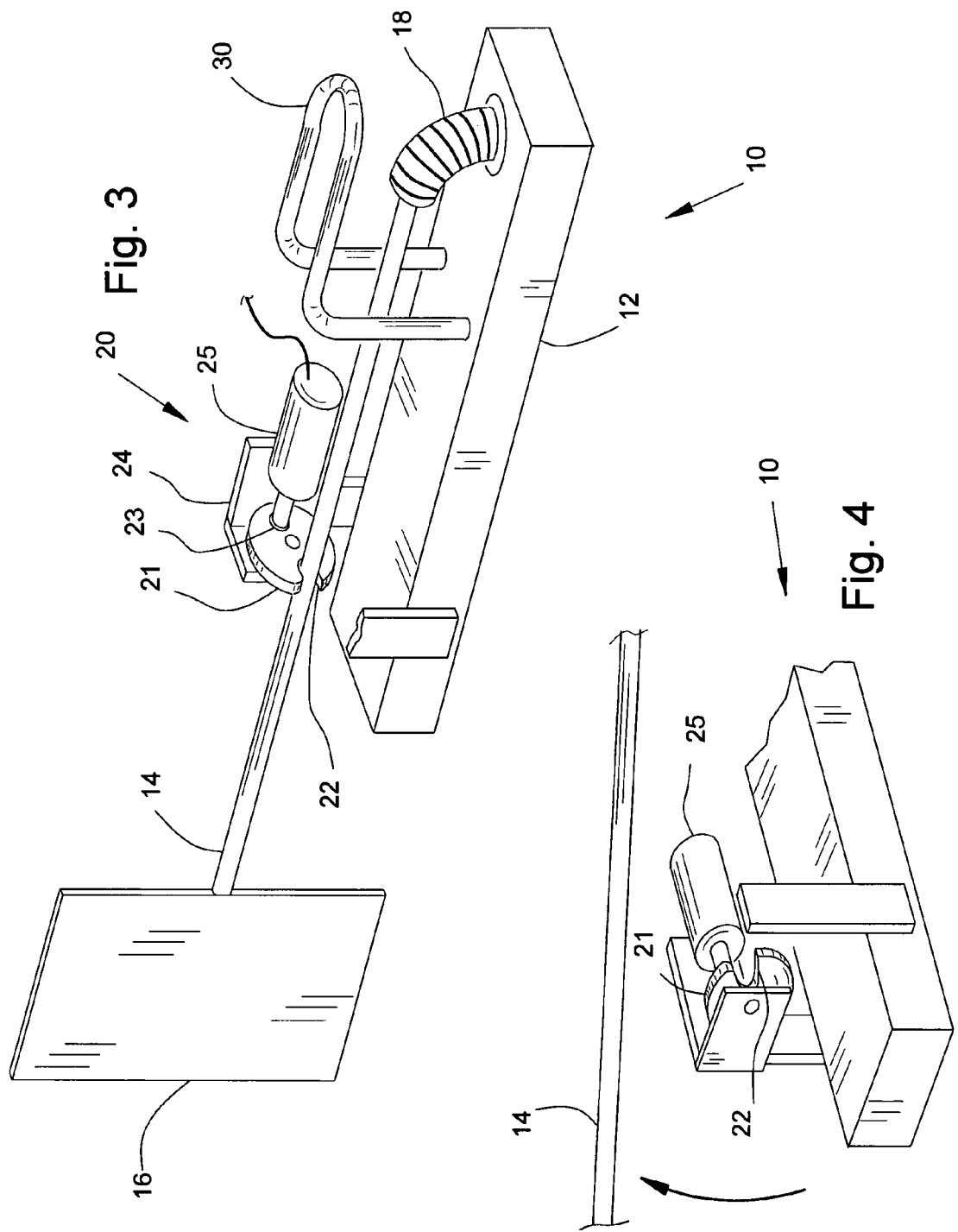

VEHICLE OPERATOR SAFETY SIGNAL

BACKGROUND OF THE INVENTION

The present invention pertains to vehicle mounted signaling devices and indicators directed at the operator of the vehicles. In particular, the invention is a safety system for automatically signaling an operator of a vehicle upon the operator's exiting the vehicle. The inventive system includes a sign, flag, or other indicator, exterior to the vehicle operating compartment, that requires manual resetting by the operator at a location outside the operating compartment. Deployment of the sign may be used as a reminder or alert of a required safety procedure or condition.

The prior art includes many vehicle mounted devices directing at signaling or alerting a vehicle operator. These include manual and automatic initiation. Examples include a conventional turn signal indicator light that may remind a vehicle operator of an illuminated turn signal. However, in normal operation of a motor vehicle these indicators are either automatically reset or manually reset from a location within the vehicle operating compartment and therefore cannot serve the present purposes.

Municipal utility engineers and similar workman often operate from work trucks and similar motor vehicles that are used, in part, to convey needed equipment. For example, an electrical utility engineer may operate a truck to travel to a work site and also to transport ladders and electrical test equipment needed to work on electrical power transmission lines. It is not unusual for equipment to be lost as a result of an engineer forgetting or not seeing the deployed equipment at the time the engineer leaves a work site. Similarly, other persons may be standing, or have parked other vehicles, adjacent the engineer's truck, and movement of the truck may cause damage or harm to them. Consequently, to address this problem, it is a matter of work procedure in some utility workforces to place a highly visible traffic cone adjacent a vehicle at the time of arriving at a work site. The typically required procedure is to, before leaving a work site, circle the vehicle to inspect the area and gather any equipment before placing the traffic cone back on the vehicle. The cone functions, in part, as a reminder to the engineer/operator of the vehicle. Unfortunately, in too many instances the procedure is not followed, and the traffic cone and any reminding equipment are left behind. Essentially, a traffic cone employed in this manner is not a sufficient signal to the operator.

What is needed is a more effective system to alert and remind vehicle operators of safety procedures such as to traverse around a vehicle to observe the surrounding area. Such a system ideally is deployed automatically if the operator leaves the operating compartment of the vehicle, and also requires the operator to traverse around the vehicle before leaving the site. In this way, the operator is more likely to observe any unrecovered equipment and ensure the safe movement of the vehicle. Such a system should be simple to operate, yet difficult for a vehicle operator to circumvent or thwart.

SUMMARY OF THE INVENTION

The present invention is a device and system for signaling and alerting a vehicle driver operator after the operator leaves a vehicle compartment. A signaling device such as a rigid sign or flexible flag is physically located, in a deployed condition, in a forward line-of-sight of the operator of the vehicle. The signaling device is deployed automatically in the event of the opening of a vehicle door from the inside of a vehicle compartment. Resetting of the signaling device, to a collapsed condition that is out of the operator's line-of-sight, requires manual operation by the vehicle operator from a position outside the vehicle compartment.

In normal operation, a vehicle operator will leave the vehicle, to perform outside activities, by exiting the vehicle compartment. This will require use of a conventional inner door handle or latch. Operation of the latch will initiate automatic deployment of the inventive signal. After the outside activities are completed, the operator must manually reset the signal before operating the vehicle. This action itself will alert the operator of a safety procedure, such as, for example, walking around the vehicle to ensure there are no nearby persons. If the operator attempts to drive the vehicle away without first resetting the signal, the signal will obstruct the operator's line-of-sight from the vehicle compartment and be seen, again alerting the operator of the safety procedure. The signal will remain until manually reset to a collapsed condition by the operator.

The invention includes a system that can alert a vehicle operator of a required safety activity in a manner that is not easily ignored or thwarted by the operator.

The invention includes a device that can be retrofitted to existing vehicles to provide the safety operations of the invention. In one preferred embodiment, a signal deploying device is mounted on a front bumper of a vehicle. Alternatively, the inventive system may be integrated into the construction of a vehicle.

While false signal events may occur with some embodiments of the invention, such as in the event an operator has to momentarily leaving the vehicle in a manner not requiring safety activities, this hardship is balanced by the value of the simplicity of the invention.

Additional novel aspects and benefits of the invention will be discerned from the following description of particular embodiments and the accompanying figures.

DESCRIPTION OF THE DRAWINGS

FIGS. 3 and 4 are detailed perspective views of the inventive signal deployment device, showing the collapsed, and released and upright conditions, respectively.

DETAILED DESCRIPTION OF THE INVENTION

Figure 1:
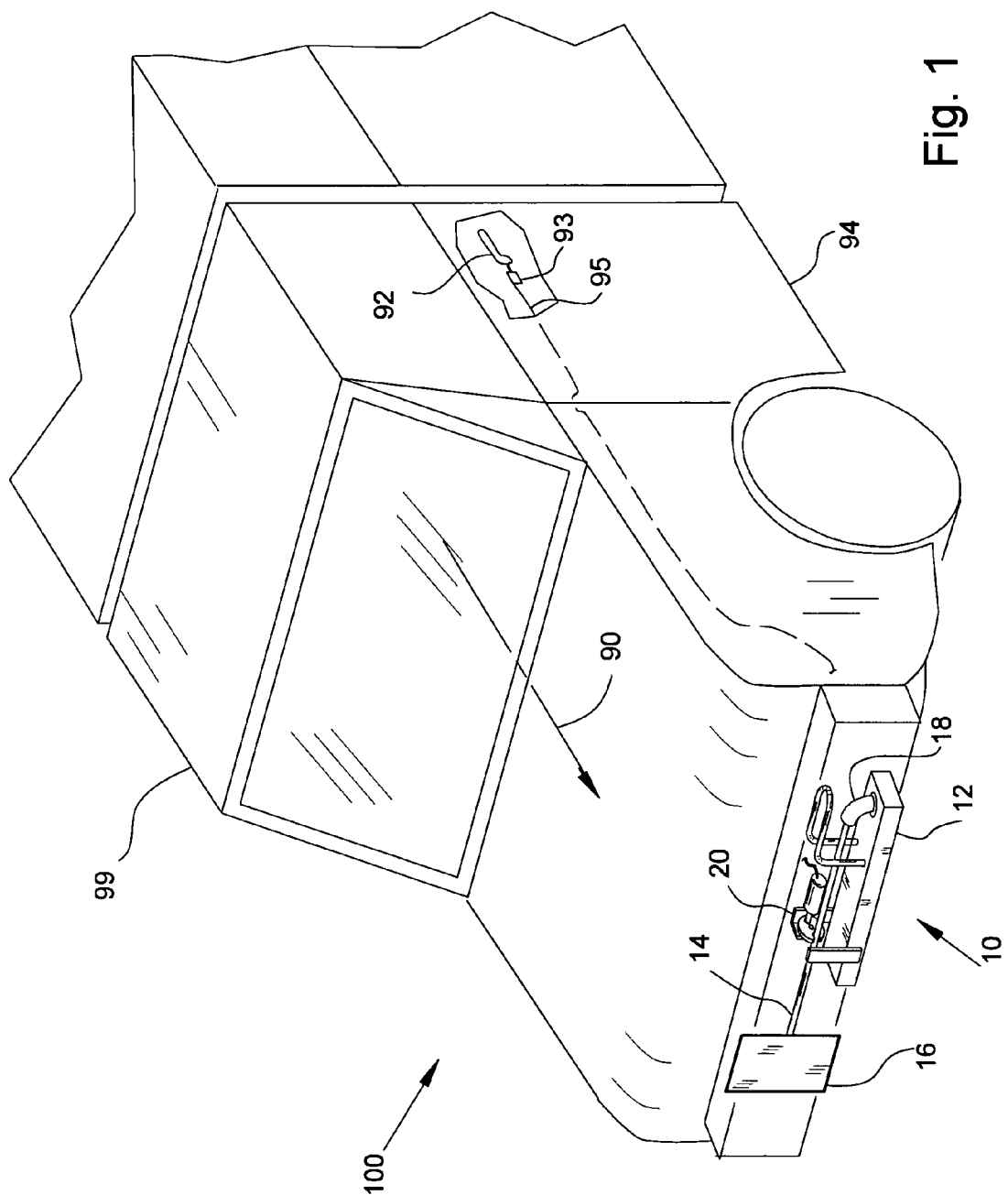
FIG. 1 is a perspective view of one embodiment of the inventive system as installed on a vehicle. The operator signal is in a collapsed or reset position.
Figure 2:
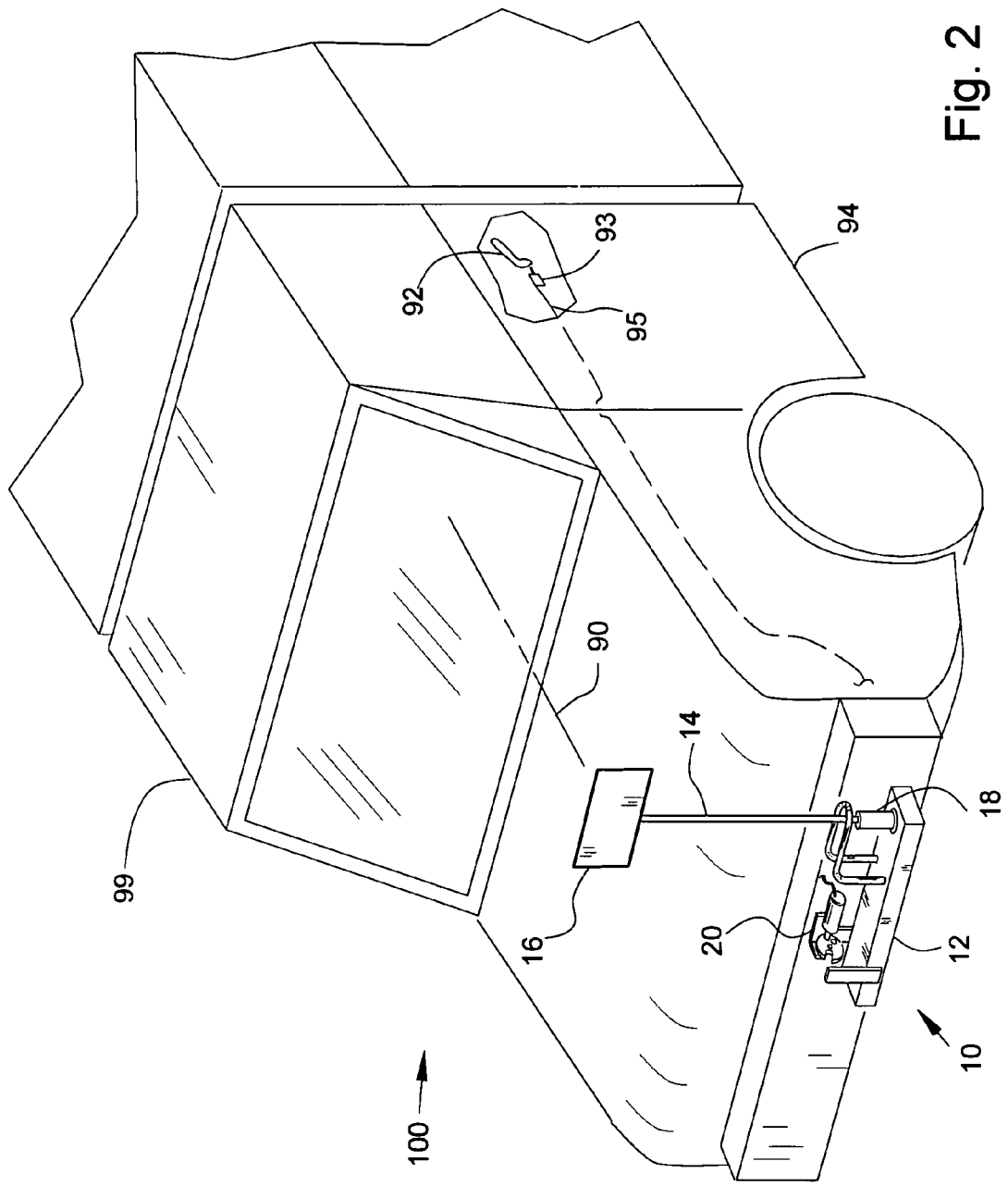
FIG. 2 shows the same device as FIG. 1, but with the operator signal in a released, upright, signaling position.

FIGS. 1 and 2 depict the inventive signaling device mounted on a conventional motor vehicle 100, such as a commercial truck. FIGS. 3 and 4 provide more detail illustrations of an inventive signal deploying structure in various operating conditions. The device in FIG. 4 is shown truncated for simplicity. All of the figures depict the same embodiment and the following discussion pertains to them all.

A signal deploying device 10 includes rigid base 12 on which is mounted an elongated staff 14. A rectangular sign 16 is secured to the distal end of the staff 14. The base 12 is configured to be rigidly mounted onto an exterior portion of the vehicle body and should be located at a position to enable proper deployment of the sign 16 as described below. The staff 14 is connected at one end to the base 12 via a flexible resilient member, in this embodiment a metal coil spring 18. The spring 18 is rigidly secured at one end to the base 12 such that the spring 18 biases the staff into an upright position (FIG. 2) in a released condition, when not otherwise restrained. The spring 18 should also allow the staff 14 to be temporarily bent over (collapsed—see FIG. 1). The resilient member may be provided by other structures and devices that provide the same characteristics and functions as the spring 18.

A latch 20 is provided mounted on the base 12 and serves to capture and retain the staff 14 when the staff 14 is manually moved into the collapsed condition as shown in FIGS. 1 and 3. Preferably, in the collapsed condition, the staff is bent over at a 90-degree angle from its upright, released, condition. However, this angle is not critical and the collapsed condition is characterized by a staff and signal location out of the line-of-sight 90 of the operator. This may be accomplished by different angles and configurations of the deploying device 10 and sign 16. Preferably, in the collapsed condition, the sign 16 is below the level of any vehicle body portion in front of the operator, such as an engine hood cover, to ensure a shield from the operator viewing the sign. In all cases, the collapsed condition should provide for an unhindered operator line-of-sight for normal viewing of the vehicle pathway.

In the embodiment shown, the latch 20 consists of a metal disk 21 that is rotatable on a center axis. The disk 21 is mounted on a rigid frame 24 that is rigidly connected to the base 12. The disk 21 may be secured to the frame 24 by a threaded bolt that also serves as the bearing surface about which the disk 21 rotates. The disk 21 has a perimeter slot 22 configured to accept and retain the staff 14. In a resetting operation, the staff 14 is manually displaced by a user to bend the staff 14 over and engage the staff 14 into the slot 22. The staff 14 is forced against the slot 22 to rotate the disk 21 into a locked position.

Locking of the latch 20, and retention of the staff 14, is carried out by a latch lock consisting, in this embodiment, of an electro-mechanical solenoid 25 mounted to the base 12 via the frame 24. A solenoid shaft, biased outward, automatically engages a hole 23 in the disk 21 when co-aligned in a locked condition. Energizing of the solenoid, in the released condition, withdraws the solenoid shaft from the hole 23, allowing the disk 21 to rotate, thereby releasing the staff 14. In the collapsed and locked (reset) condition, the tension of the staff spring 18 forces the staff 14 against the disk slot 22, and causes the disk 21 to rotate when released. The general manner of operation of the solenoid in the latch 20 is known in the art and construction and operation of the solenoid and latch will be clear to one skilled in the art.

It is essential to the invention, that the staff 14 require manual handling to be collapsed and locked. To accomplish this in the embodiment shown, a user pushes on the staff 14 using the user's hand, and bends the staff downward to contact and engage the slot 22 of the latch disk 21. By pushing the staff 14 into and against the disk 21, the disk is turned to position the disk 21 such as to allow the solenoid shaft to engage in the disk hole 23. The disk slot 22 is shaped and located on the disk 21 such that, in this orientation, the spring tension on the staff 14 biases the staff 14 into the slot to retain it there. Once so engaged, the staff 14 is retained until the solenoid 25 is energized to retract its shaft from the hole 23.

From the locked, reset, condition, the staff 14 can only be released to raise the sign 16 by energizing the solenoid 25. To accomplish the purposes here, this should occur only upon operation of a door opening mechanism such as a door latch 92 on the inside of a vehicle operating compartment 99. A vehicle operating compartment herein means the usual location from which an operator driver controls and steers the vehicle. Typically, this is where a driver's seat and steering wheel are located. It is essential that the solenoid 25 be energized only upon operation of an inner door opening mechanism—a door handle—such that the staff 14 is released and sign 16 raised into the operator's line-of-sight 90. In this manner, at any time that an operator leaves the vehicle, the sign will be deployed, requiring the operator to move to the front of the vehicle 100 to manually reset the staff 14. It is presumed that leaving the vehicle requires operation of an inner door handle by the operator.

Operation or use of any door handle or latch outside the operator compartment should have no effect on the inventive device—should not energize the solenoid 25. This is essential to the objective that the device sign be deployed only upon the event of the operator attempting to leave the vehicle compartment.

To enable proper activation of the solenoid 25, a conventional trigger or switch 93 is located within the vehicle, preferably within the door 94, and is configured to complete an energizing circuit 95 when the door latch 92 is operated. The outside of the vehicle door 94 in FIGS. 1 and 2 is shown partially cut away to reveal components of the invention. The switch 93 (or equivalent device) is connected to the solenoid 25 and a vehicle battery through the energizing circuit 95 that includes conventional wiring running within the vehicle body panels. The design and operation of the switching device and energizing circuit 95 are conventional, and proper selection and design of the components and system follows practices typical of similar systems.

The switching and energizing cannot be initiated solely by movement of the door 94 itself, rather than the inside door latch 92 as discussed above. This is because release of the staff 14 upon opening of the door from the outside is contrary to the need and objectives of the invention—as an operator entering the vehicle from the outside, by opening the door 94, should not activate the device.

To effectively signal and alert a vehicle operator, the sign 16 must be moved into the operators line-of-sight 90. Herein, line-of-sight means the normal forward view path of an operator located in the normal position to drive and operate the associated vehicle. For most vehicles, the line of sight will extend forward, from the operators position in the operating compartment, and generally horizontally over the vehicle forward of any windshield, and centered or more preferably off-center towards the operators side of the vehicle with respect to the vehicle centerline such that an object placed in the line-of-sight will obstruct required vision for operating the vehicle. A sign located at a position to the side or rearward of the operator will not serve the intended purpose.

The signal deploying device 10 is most preferably located on the front of the vehicle, such as on a front bumper as shown in the figures. The device must be located outside the vehicle compartment and sufficiently distant from the compartment to ensure that the operator must leave the vehicle compartment to reset the device by manually moving the staff into the locked reset position.

In the embodiment shown in the figures, the signaling device is a rigid rectangular sign 16. Many alternative signaling devices may be used to same effect. Other devices which will similarly signal and alert an operator by its visible presence in the operator's line-of-sight, and can be mounted and operated from a staff as shown, may be used. Example alternatives include fabric or plastic flags, inflated signs, signs having moving elements or lighted elements. The signaling device may include surface placed text content, such as instructions, but this is not necessary.

In the embodiment shown, a staff guard 30 extends from the base 12 to surround and protect the staff 14 when in the release, upright, condition. The staff guard 30 is not essential to the operation and function of the invention and may take alternative forms or be removed.

The signal deploying device 10 provides a structure for securing, through the base 12, the attached components to the exterior of the vehicle, such as at a front bumper 98. The particular size and configuration of the base 12 are not critical and need only accommodate the particular signal deploying components used. Such a base 12 and deploying device 10 as shown is convenient for the purposes of retrofitting the invention to an existing vehicle. In alternative configurations, the elements of the deploying device 10 may be integrated into the vehicle body or may be formed from an existing vehicle component. In such cases, a separate base element may not be needed.

The device shown in the figures is one example of a signal deploying device satisfying the requirements of the invention. Other embodiments provide the same essential function of automatically deploying a sign or like signaling device into the line-of-sight of a vehicle operator upon operation of an inner door latch, handle, or the like. The deploying device may take any of a variety of forms and may use different mechanisms. For example, the sign and staff may be an integrated single structure. Also, the mechanism for moving the sign into the line-of-sight may include other forms of springs, or other mechanisms, and may use other motive means such as hydraulic or pneumatic power. The particular movement and path between the upright and collapsed conditions is not limited and various equal alternatives are available such as entirely vertical movement without the rotation inherent in the bending over of the staff 14. As well, the means of locking and releasing the sign and staff may take other forms, and may be, for example, integrated into the motive device. In all embodiments, the sign or other operator signaling device must be capable of being reset out of the line-of-sight by manual operation only—by an operator at a location outside the vehicle compartment. Power for energizing or powering the invention components may come from any resident vehicle power source, or a dedicated power source integrated into, or provided with, the present device, such as a secondary electrical storage battery.

The base 12 in the embodiment shown is included as a convenient structure to assemble the deployment components including the staff 14, spring 18 and latch 20 and to mount them in coordinated fashion to a vehicle. In alternative embodiments, a vehicle body component may form the base. In other alternatives, the operating components of the deployment device may be mounted directed on or in the vehicle without a discernible base structure. In any such case, the operation and function of the invention remains the same.

In use, the staff 14 is normally in the collapsed and locked condition as seen in FIG. 1. A driver operator may enter the vehicle compartment through the door 94 without the sign deploying. Once within the vehicle, with the door closed, the operator cannot leave the vehicle through the door 94 without automatically deploying the sign 16. By operating the inside door latch 92, the switch 93 completes the energizing circuit 95 so that the solenoid 25 retracts its shaft to allow the staff 14 to spring upright. This will typically occur when the vehicle is driven to a work sight and the operator leaves the vehicle to perform some activity outside the vehicle. If the operator attempts to move the vehicle by driving it from the normal operating position, the operator will be alerted by the upraised sign in the operator's line-of-sight to perform the desired safety or equipment check, or other activity. To move the sign from the operator's line-of-sight, the operator must leave the vehicle compartment, move to the deploying device 10 and manually reset the staff 14. The extent of this activity is designed to ensure the operator is fully reminded of the required activities before operating the vehicle.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

The invention claimed is:

1. A vehicle having a novel operator signaling system comprising:
   a vehicle body having an enclosed operating compartment including a door with an inner door latch;
   a rigid base secured to the vehicle body at a point forward of the operating compartment;
   a elongated staff having a sign secured to one staff end;
   a spring secured between the base and the staff and configured to bias the staff into an upright position and allow the staff to be moved into a collapsed position;
   a releaseable lock configured to retain the staff in the collapsed position and allow the staff to move into the upright position when released, the lock released when receiving an electrical signal;
   a switch connected to the vehicle inner door latch;
   a circuit connected to the switch and the lock, such that operation of the door latch will operate the switch to direct an electrical signal to the lock and release it; and
   wherein the staff in the upright position is in the direct line-of-sight of an operator of the vehicle and can be moved into the collapsed position to be retained by the lock only by manual operation.

2. A safety system for alerting an operator of a vehicle comprising:
   a rigid base secured to a vehicle at a point forward of a vehicle operating compartment;
   an elongated staff having a sign secured to one staff end;
   a spring secured to the base and the staff and configured to bias the staff into an
   a switch connected to an operating compartment inner door latch;
   a circuit connected to the switch and the lock, such that operation of the door latch will operate the switch to direct an electrical signal to the lock and release it; and
   wherein the staff in the upright position is in the direct line-of-sight of an operator of the vehicle and can be moved into the collapsed position to be retained by the lock only by manual operation.

3. A safety system for providing signaling to an operator of a vehicle comprising:
   an operator signaling device secured to a vehicle at a point forward of a vehicle operation compartment;
   a deployment means for moving the signaling device from a collapsed condition to an upright condition wherein the signal device is in a vehicle operator direct line-of-sight, and for allowing only manual movement of the signaling device from the released condition into the collapsed condition;
   a release means for causing the deployment means to move the signaling device from the collapsed condition to the upright condition upon operation of a vehicle inner door latch; wherein the deployment means comprises: a spring connected to the signaling device and a vehicle body and configured to bias the signaling device into the upright condition; a latch secured to the vehicle body and configured to releaseably retain the signaling device in the collapsed condition.

4. A safety system, according to claim 3, and wherein:
the signaling device comprises an elongated staff and a rigid sign secured to a staff end.

5. A safety system, according to claim 3, and wherein:
the release means comprises:
- a lock mounted on or in the vehicle and configured to releaseably retain the signaling device in the collapsed condition, the lock electrically controlled;
- a circuit within the vehicle configured to control the lock, and including a switch located in a vehicle door and configured to allow the circuit to release the lock upon operation of the inner door latch.

\* \* \* \* \*